US006570848B1

(12) United States Patent
Loughran et al.

(10) Patent No.: US 6,570,848 B1
(45) Date of Patent: May 27, 2003

(54) SYSTEM AND METHOD FOR CONGESTION CONTROL IN PACKET-BASED COMMUNICATION NETWORKS

(75) Inventors: Kevin Loughran, Castleblayney (IE); Edele O'Malley, Dublin (IE); Kam Choi, Tring (GB); John Hickey, Ratoath (IE)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/353,609

(22) Filed: Jul. 14, 1999

(30) Foreign Application Priority Data

Mar. 30, 1999 (GB) .............................................. 9907172

(51) Int. Cl.[7] ................................................. H04J 3/14
(52) U.S. Cl. ..................... 370/230.1; 370/232; 370/236; 370/413
(58) Field of Search ............................. 370/229–235.1, 370/412–414, 410, 522, 236; 710/57, 60

(56) References Cited

U.S. PATENT DOCUMENTS 5,946,297 A * 8/1999 Calvignac et al. .......... 370/230
5,999,533 A * 12/1999 Peres et al. ................. 370/395
6,014,384 A * 1/2000 Weberhofer ................ 370/455
6,259,698 B1 * 7/2001 Shin et al. .................. 370/395
6,496,940 B1 * 12/2002 Horst et al. ..................... 714/4

FOREIGN PATENT DOCUMENTS

| GB | 2328593 A | 2/1999 |
| WO | WO 94/14264 | 6/1994 |
| WO | WO 96/41456 | 12/1996 |

* cited by examiner

Primary Examiner—Seema S. Rao
Assistant Examiner—Ronald Abelson
(74) Attorney, Agent, or Firm—Nixon & Vanderhye P.C.

(57) ABSTRACT

A network switch including a port for the reception and transmission of data packets, and a receive buffer store connected to the port, detecting a predetermined state of fullness of the buffer store, initiating in response to the state of fullness the production of control frames for signaling to a source of packets to pause the sending of packets to the switch, counting said frames to obtain a measure of congestion of the switch, and responsive to a rate of change of measure to enable the discarding of packets received by the buffer when rate is higher than a first predetermined value and to disable the discarding of packets when the rate of change of the measure is below a second predetermined value.

8 Claims, 3 Drawing Sheets

SYSTEM AND METHOD FOR CONGESTION CONTROL IN PACKET-BASED COMMUNICATION NETWORKS

FIELD OF THE INVENTION

This invention relates generally to congestion control in packet-based communication networks, such as local or wide area networks wherein information is conveyed from node to node by means of data packets each of which has a conventional format including typically a preamble, address data specifying a source and a destination, followed by user data. The invention is particularly though not exclusively intended for use on Ethernet networks.

BACKGROUND TO THE INVENTION

The invention is particularly concerned with the control of congestion at a network switch by means of intelligent flow management while attempting to minimize the effect of that management on the throughput of packets.

The invention is intended to be generally applicable to network switches which have capacity for the temporary storage of data packets received at a port and is not intended to be limited to any particular switching, routine or bridging function that is to be performed by the device, herein generically called 'switch'. A practical example of a switch to which the invention may be applied is the LS1000 switch made by 3Com Corporation.

Switches of the above-mentioned kind and many others having ports for the reception and transmission of data packets have a respective dedicated memory space for the buffering of packets received by a respective port, packets being held in the buffer storage until, after appropriate look-ups, priority resolution, contention resolution and so on, they may be forwarded to their respective destinations, usually after further temporary buffer storage.

Typically, the buffering for each port of a switch having respective buffering for each port is capable of handling bursts of packets up to some fairly small number, such as sixteen, of packets. If the burst size is greater than the minimum, the incoming traffic rate will exceed the outgoing rate or the buffer capacity and packets should be discarded.

It is known, in switches such as the LS1000 switches, to employ an adaptive technique, herein called intelligent flow management. Such a technique compensates for minimum memory per port and attempts to avoid loss of packets when congestion occurs, when there is not enough memory to store incoming packets. The switch employs 'back-pressure', usually by means of control frames sent back to the transmitting node, to force the continued buffering of packets at the remote source, that is to say the transmitting node providing packets to the respective port of the switch, until such time as the congestion at the switch is cleared.

Before the introduction of packet-burst technology when communication systems are sometimes unreliable, there was a one for one relationship between packets sent by a transmitting node and the packets acknowledged by the receiving node. Thus an acknowledged packet was sent by the receiver for each packet it received. Since communications have become more reliable, protocol efficiency has been increased by reducing the number of acknowledgements sent by a receiver and a one for many relationship exists. Thus a burst or window of sequence packets are sent by the transmitting node and one acknowledgement is sent back by the receiving node which indicates if all the packets in the burst were received or the sequence numbers of packets in the burst that were missing. The transmitting node then resends the missing packets or transmits the next burst.

Depending on network traffic and congestion there is normally an optimal size for a packet burst. A typical protocol (such as IPX) automatically optimizes the packet burst before and during packet transfer. It uses two variables to optimize burst mode. The primary variable is an inter-packet gap (IPG) which is varied until there is no packet loss. The secondary variable is the size of the packet window which is varied from a default or user configurable value to a value where there is no packet loss.

The maximum IPG is initially calculated by the user and is normally called a 'half of the quickest round trip time to the destination'. After a predetermined number of successes (for example no packets dropped in six bursts) or failures (for example two packets dropped in six bursts), an algorithm is used to increase or decrease the inter-packet gap. If the inter-packet gap adjustments results in its reaching its maximum value and there are still too many failures then the window size may be decreased exponentially and the processes repeated until there is no packet loss.

However, the exertion of back-pressure will not cause a transmitting node to adjust the bursts and the use of intelligent flow control is not consonant with the adjustment of burst packet sizes. Nevertheless the invention is not intended to be limited to circumstances in which a transmitting node transmits packets in bursts.

The present invention relates to the control of back-pressure by monitoring a measure of back-pressure to determine the rate thereof and to adjust the discarding of packets depending on the rate of increase or decrease of the rate.

Various features of the invention will be made apparent in the following, which is both a schematic and particular description of an example of the invention.

DETAILED DESCRIPTION

As indicated in the foregoing, the present invention particularly relates to the control of congestion in network switches in packet-based communication systems.

Figure 1:
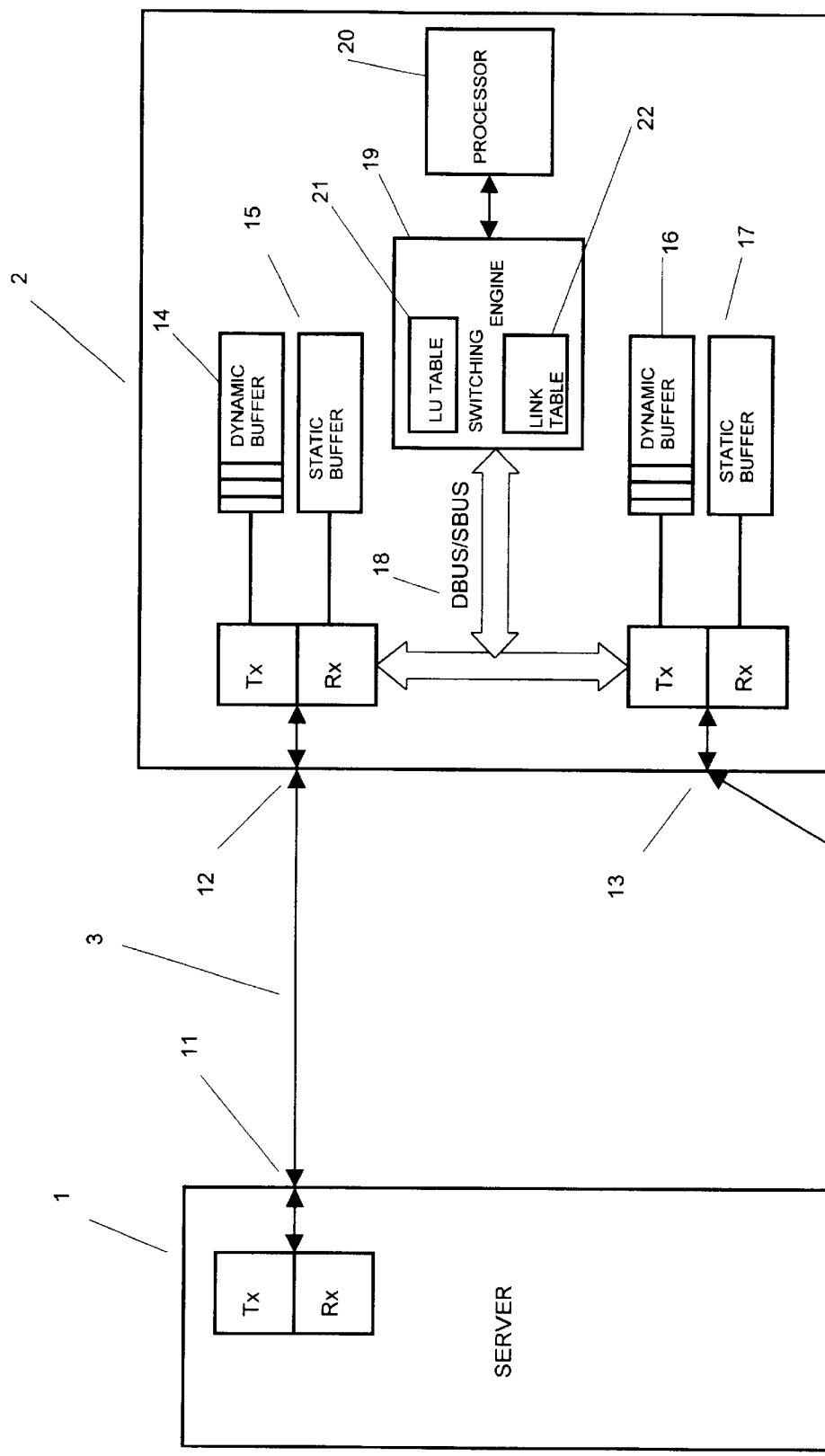
FIG. 1 illustrates schematically only part of a packet-based communication network including a switch operated according to the present invention.

In order to illustrate the essential elements of the invention, reference will first be made to FIG. 1, which is a much simplified diagram of part of a packet-based network in which a network device 1 (such as a server) is connected to a switch 2 by way of a duplex link 3. The device 1 may be connected to switch 2 by way of intervening devices.

Much of the construction and organisation of the switch is not essential to the invention and may readily follow known practice, as exemplified by the LS1000 switch made by 3Com Corporation.

Switch 2 would normally have a multiplicity of ports. For the purpose of simplicity, the device 1 is shown as having a duplex port 11 and the switch 2 is shown as having two duplex ports 12 and 13. Each of the ports has a "transmit" path (denoted Tx) and a "receive" path, denoted Rx. As is shown in relation to the switch 2, the receive paths of each port are associated with a static buffer for the temporary storage of packets received at the port while various address control and type data of the packets is being examined and/or processed in a switching engine. Each transmit path of each port includes an output or transmit buffer. Port 12 is shown as having a transmit buffer implemented as a dynamic buffer 14, a receive buffer 15 implemented as a static buffer, and port 13 of switch 2 has transmit buffer 16 and receive buffer 17 respectively. It will be assumed that device 1 is capable of altering a packet burst size in accordance with for example the IPX protocol or the TCP sliding window protocol.

Normally, the receive buffer, which may be implemented in SRAM or otherwise, is intentionally limited in memory space so that "back pressure" or "flow control" will be applied if a receive buffer is too full, though the cause of congestion in this buffer is likely to be an excessively full transmit buffer for the port to which packets received are being sent.

Switch 2 includes, as is customary, a bus 18 which in this example is illustrated as both a data bus and a status bus whereby packets are sent, under the control of a switching engine 19, across the switch (from port to port) as necessary. The switching engine 19 is managed by a processor 20 and includes a look-up table 21 and a link table 22. These are known functions of a switch of this nature. Briefly, the look-up table 21 is employed to examine source addresses of incoming packets in order to set up entries which identifies ports with respective source addresses and is employed to examine destination addresses of incoming packets in order to determine (if there is an entry in the table) the port or ports from which that packet should be forwarded. The link table 22 establishes the necessary control for switching a received packet to the port or ports from which it is to be forwarded.

In order to illustrate the process of exerting back pressure, it will be assumed that a packet is to be sent by way of device 11 on switch 1, over the path 3, to port 12 on switch 2 and be forwarded from port 13 on switch 2. The receive path of port 12 receives the packets from device 1 and places them in its static receive buffer 15. A look-up request is sent to the switching engine 19 which by means of the look-up table 21 performs a look-up and determines that the packet is intended for port 13. The link table 22 sets up the necessary link, by way of control of the data bus 18, to enable the sending of the packet in its turn across the switch 2 to the dynamic transmit buffer 16 for port 13.

If this transmit buffer 16 has sufficient room to take the packets the packet is streamed across the data bus into the dynamic buffer 16 of port 13 and the packet is subsequently sent out on port 13. During this process, the link table monitors the status of the dynamic buffer 16.

If the transmit buffer 16 for port 13 fills up, e.g. if the burst is too large, the link table causes the port 12 to exert 'back pressure' on port 11. The back pressure is exerted by causing port 12 to send control frames instructing port 11 to pause, i.e. to cease sending packets for an interval specified in the control frames. The control frames are generated by the processor and sent by way of bus 18 and as directed by the link table 22 to the transmit buffer 14 of port 12.

The purpose of exerting back pressure is to avoid loss of packets. It can overcome short-term congestion but in itself will not relieve long-term congestion at switch 2 because it will not reduce the burst size employed by device 1.

Two known features of a switch need mention. First, if a receiver (e.g. switch 2) is unable to receive packets owing to lack of buffer space, it returns to the source an acknowledgement that packets have not been received. Second, the link table can be enabled to provide a 'discard-on-transmit' function: this is implemented when the transmit buffer for the relevant port (i.e. port 13) is full; the link table causes the sending of packets by way of bus 18 from the relevant receive buffer to the relevant transmit buffer. Since that buffer is full, the packets are not written to the buffer and are automatically discarded. If 'discard-on-transmit' is disabled, such packets are not transmitted across the switch and remain (temporarily) where they are in the receive buffer.

Since, the reduction of burst size depends on the loss of packets and intelligent frame management is intended to avoid the loss of packets, the two are incompatible. The present invention provides a method of adjusting intelligent frame management to allow packet loss in certain circumstances, e.g. when long-term congestion occurs. Such packet loss results in a automatic decrease in burst size at the relevant source and minimizes the effect on throughput.

Figure 2:
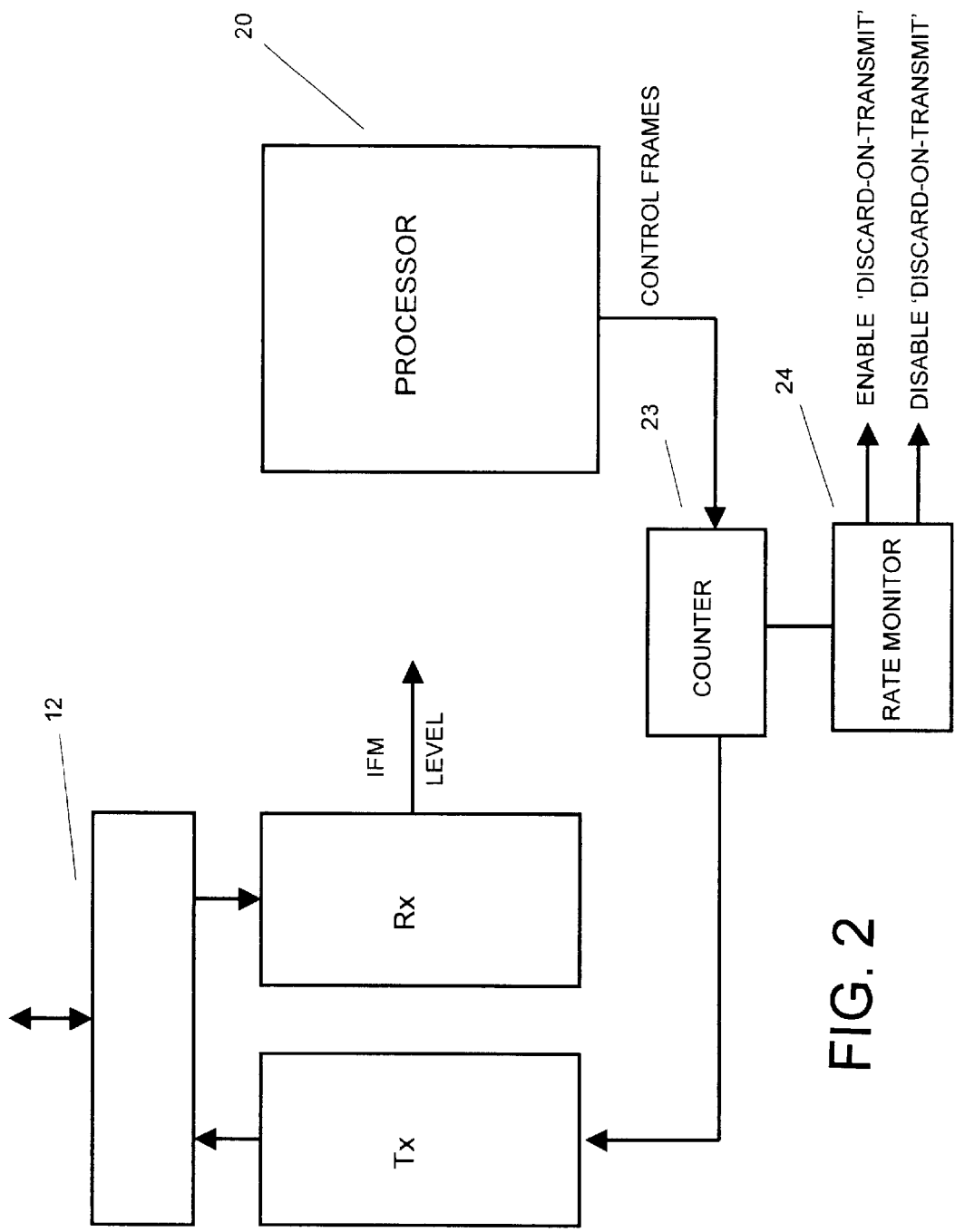
FIG. 2 illustrates the relevant part of a switch according to the invention.

FIG. 2 illustrates the generation of control (IFM) frames for port 12 in response to a predetermined state of fullness of the receive buffer. It is customary to monitor the number of such frames produced (said number being called the 'jam count') by means of a counting function, shown by counter 23. According to the invention, the rate of change of the jam count maintained by the frame counter 23 is monitored by a rate monitor 24 which may for example count a change in the count in some selected time. The rate monitor 24 requires in this example two thresholds, one for enabling the 'discard/on/transmit' function if the rate of increase of the jam count is above some certain or selectable value, and another for disabling said function if there is a decrease in the rate of change of the frame count. It will be readily appreciated that this monitoring and production of events may be achieved either in hardware or software, though preferably the latter, according to preference. The thresholds may be differently set so that discard-on-transmit is with a comparatively slow response time (i.e. the enabled measuring period is long and is disabled with a rapid response time (i.e. the measuring period is comparatively short).

Thus the present invention modifies the exertion of back-pressure by making it dependent on a measure of the rate at which congestion is increasing or decreasing. The count may be in terms simply in the number of control frames. A more sophisticated count would be a count which weights the number of frames by the pause times specified in it. In any event, the count in the frame counter is a measure of the state of congestion at the switch 2 in respect of packets received by way of port 12.

Figure 3:
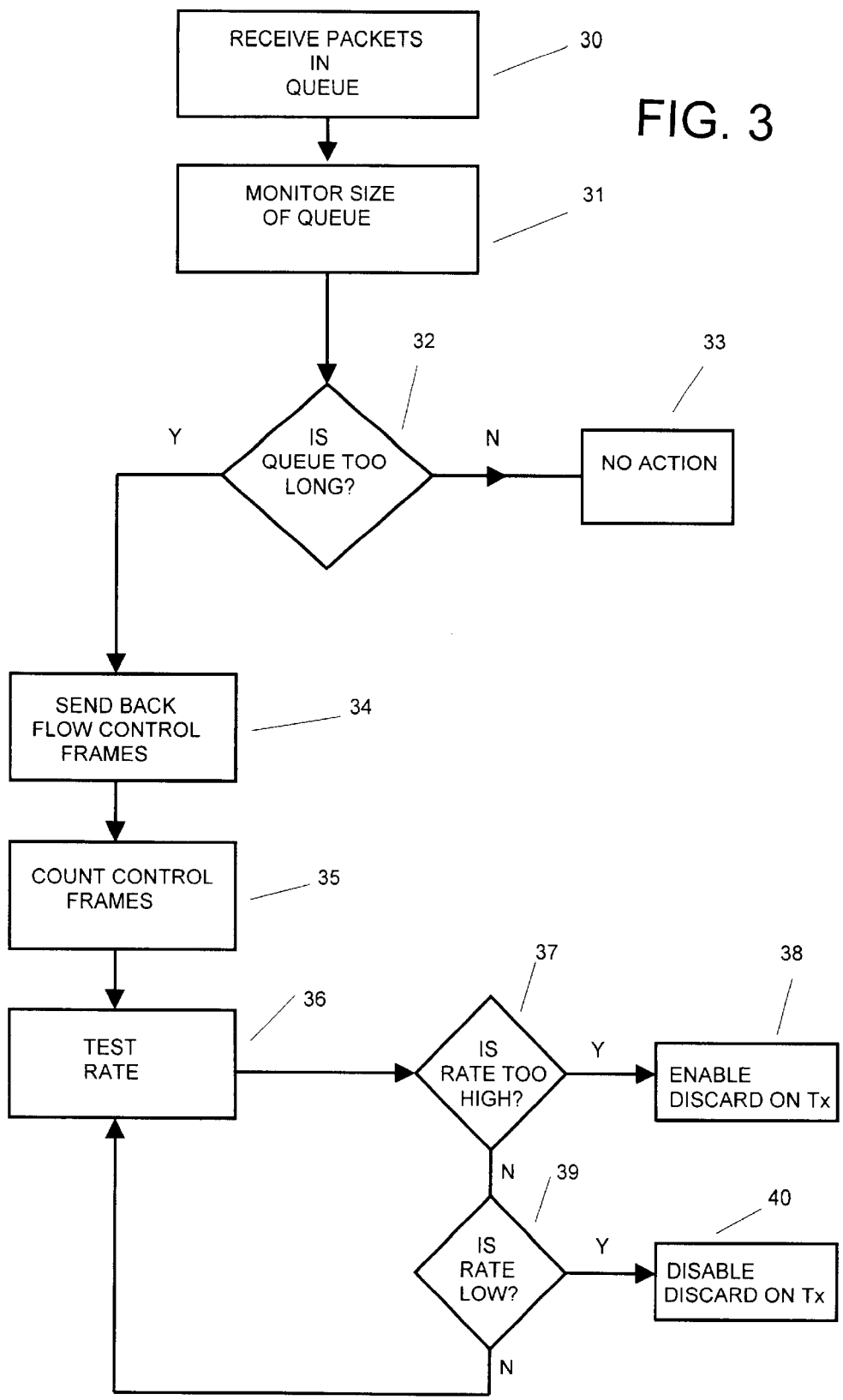
FIG. 3 is a flow diagram illustrating the flow control process according to the invention.

The process is illustrated in FIG. 3. Stage 30 represents the receiving of packets in a queue defined by buffer 15, stage 31 represents the monitoring of the size of the queue, stage 32 is a test to see whether the queue is too long according to a selected criterion. If the queue is not too long then there is no action, stage 33. If the queue is too long, flow control frames will be sent back via port 16, stage 34. The frame counter counts control frames, stage 35, and the rate monitor 35 tests the rate of production of control frames, shown in stage 36. Stages 37 to 40 show the tests for a rate which is too high and the enabling of the 'discard on transmit' function, stage 38 as well as the test for a rate which is below a threshold and the disabling of the 'discard on transmit' function.

What is claimed is:
1. A network switch comprising:
 a port for the reception and transmission of data packets, and a receive buffer store connected to the port, means for detecting a predetermined state of fullness of the buffer store, means for initiating in response to the state of fullness, the production of control frames for signaling to at least a first source of said packets to pause the sending of packets to the switch, means for counting said frames to obtain a measure of congestion of the switch, and means responsive to a rate of change of said measure to enable the discarding of packets received by the buffer when said rate is higher than a first predetermined value and to disable the discarding of packets when the rate of change of the measure is below a second predetermined value;

wherein said switch includes at least one other port and a transmit buffer associated with said port and wherein said switch causes said discarding of packets by causing packets to be transmitted across the switch from said receive buffer to said transmit buffer whereby said packets are discarded if said transmit buffer is full.

2. A network switch as in claim 1 wherein the first port is associated with a transmit buffer and said control frames are sent to said transmit buffer of the first port.

3. A network switch as in claim 1 wherein said means for counting is disposed to count frames in a defined time.

4. A network switch as in claim 1 wherein the first port is associated with a transmit buffer and said control frames are sent to said transmit buffer of the first port.

5. A network switching method comprising:

receiving and transmitting data packets at a port having a receive buffer store connected to the port, detecting a predetermined state of fullness of the buffer store, initiating in response to the state of fullness, the production of control frames for signaling to at least a first source of said packets to pause the sending of packets to the switch, counting said frames to obtain a measure of congestion of the switch, and responsive to a rate of change of said measure, enabling the discarding of packets received by the buffer when said rate is higher than a first predetermined value and disabling the discarding of packets when the rate of change of the measure is below a second predetermined value;

wherein said switch includes at least one other port and a transmit buffer associated with said port and wherein said discarding of packets is achieved by causing packets to be transmitted across the switch from said receive buffer to said transmit buffer whereby said packets are discarded if said transmit buffer is full.

6. A network switching method as in claim 5 wherein the first port is associated with a transmit buffer and said control frames are sent to said transmit buffer of the first port.

7. A network switching method as in claim 5 wherein said counting step counts frames in a defined time.

8. A network switching method as in claim 5 wherein the first port is associated with a transmit buffer and said control frames are sent to said transmit buffer of the first port.

* * * * *